(No Model.)

E. F. ST. JOHN.
SPIRIT LEVEL AND INCLINOMETER.

No. 377,870. Patented Feb. 14, 1888.

WITNESSES:
Phil. C. Dietrich
C. Sedgwick

INVENTOR:
E. F. St. John
BY Munn & Co
ATTORNEYS.

UNITED STATES PATENT OFFICE.

ENOS F. ST. JOHN, OF HIGHLAND STATION, MICHIGAN.

SPIRIT-LEVEL AND INCLINOMETER.

SPECIFICATION forming part of Letters Patent No. 377,870, dated February 14, 1888.

Application filed September 26, 1887. Serial No. 250,758. (No model.)

*To all whom it may concern:*

Be it known that I, ENOS F. ST. JOHN, of Highland Station, in the county of Oakland and State of Michigan, have invented a new and Improved Combined Level and Plumb, of which the following is a full, clear, and exact description.

This invention relates to a combined level and plumb, which may also be used for the purpose of obtaining any angle desired between a horizontal and a perpendicular line, the instrument being an improvement upon the spirit-level illustrated, described, and claimed in my application No. 230,643, filed on the 12th day of March, 1887.

Reference is to be had to the accompanying drawings, forming a part of this specification, in which similar figures of reference indicate corresponding parts in both the views.

Figure 1:
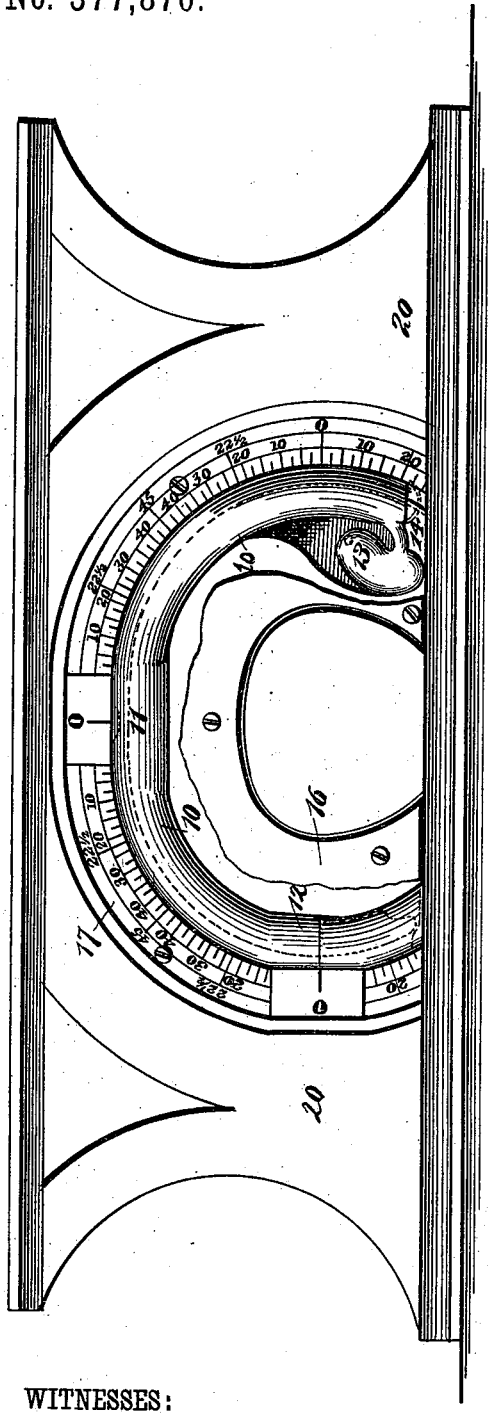
Figure 2:
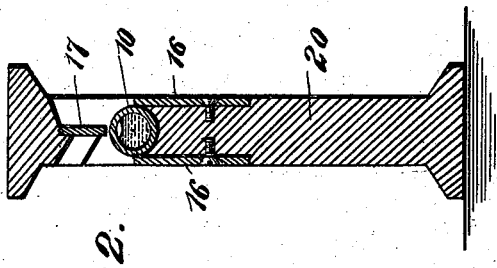

Figure 1 is a side view of my improved level and plumb, and Fig. 2 is a central cross-sectional view of the same.

The tube used in the construction of the implement illustrated in the drawings above referred to is formed with two quadrant-sections, 10, a straight central section, 11, and a straight section, 12, which extends at right angles to the line of the section 11. The end of the tube opposite that upon which the section 12 is formed is provided with a globe, 13, which globe is connected with the main portion of the tube by a narrow neck, 14.

The tube, constructed as above described, is mounted in a stock, 20, that is formed with a central recess of proper shape to receive the tube, the tube being held to place by plates 16; or, if desired, the recess need not extend entirely through the stock, and in this case but a single retaining-plate would be needed.

Above the tube I mount a graduated plate, 17, that is shaped to fit close against the upper face of the tube, the quadrant-sections of the plate being graduated as illustrated. In ordinary use—that is, when the implement is to be used as a level or a plumb—a large air-bubble is desirable; but when the implement is to be used for obtaining any desired angle a smaller bubble is preferable, and it is to provide for this change from a large to a small bubble that I have provided the globe 13, in the top of which there is always left a bubble, as indicated in Fig. 1; but by turning the implement so that the main bubble of the tube may be brought into the globe 13 the size of the bubble leaving the globe may be varied by turning the implement quickly or slowly, so as to allow a portion of the bubble in the globe to pass from the globe through the neck 14 and into the tube.

The straight sections 11 12 enable the operator to detect the slightest movement of the instrument, which could not be done so accurately if the tube were of a uniform curve. The object of using the small bubble in obtaining any angle from a perpendicular to a horizontal line is because the smaller the bubble the more perfect it will be and the quicker it may be sighted with the graduations.

Having thus fully described my invention, I claim as new and desire to secure by Letters Patent—

1. As an improved article of manufacture, a combined level and plumb consisting of a stock, a tube formed with quadrant-sections 10 and a central section, 11, said tube being fitted in the stock, and a graduated plate arranged in connection with the tube, substantially as described.

2. As an improved article of manufacture, a combined level and plumb consisting of a stock, a tube formed with quadrant-sections 10, a central straight section, 11, and a section, 12, at right angles to the section 11, said tube being fitted within the stock, and a graduated plate arranged in connection with the tube, substantially as described.

3. In a combined level and plumb, the combination, with a stock, of a tube formed with quadrant-shaped sections 10, a central straight section, 11, a straight end section, 12, and a globe, 13, that is connected to the main body of the tube by a neck, 14, and a graduated plate, the tube being held by the stock and the plate being mounted in connection with the tube, substantially as described.

ENOS F. ST. JOHN.

Witnesses:
FREDERICK HARRIS,
KITTY HARRIS.